United States Patent
Miebori

(10) Patent No.: US 8,828,599 B2
(45) Date of Patent: Sep. 9, 2014

(54) BATTERY PACK AND BATTERY-PACK EXTERIOR CASING

(75) Inventor: Tadashi Miebori, Fukushima (JP)

(73) Assignee: Sony Corporation, Tokyo (JP)

( * ) Notice: Subject to any disclaimer, the term of this patent is extended or adjusted under 35 U.S.C. 154(b) by 1018 days.

(21) Appl. No.: 12/405,726

(22) Filed: Mar. 17, 2009

(65) Prior Publication Data

US 2009/0246621 A1 Oct. 1, 2009

(30) Foreign Application Priority Data

Apr. 1, 2008 (JP) ................................ 2008-095227

(51) Int. Cl.
- H01M 2/02 (2006.01)
- H01M 2/04 (2006.01)
- H01M 10/052 (2010.01)

(52) U.S. Cl.
CPC .......... *H01M 2/0212* (2013.01); *H01M 10/052* (2013.01); *Y02E 60/12* (2013.01); *H01M 2/0404* (2013.01)
USPC ....................................................... 429/179

(58) Field of Classification Search
None
See application file for complete search history.

(56) References Cited

U.S. PATENT DOCUMENTS

| | | | |
|---|---|---|---|
| 4,033,664 A * | 7/1977 | Norman | 439/388 |
| 2005/0238930 A1 | 10/2005 | Yoshida et al. | |
| 2006/0057286 A1 * | 3/2006 | Gibbons et al. | 427/207.1 |
| 2007/0154785 A1 * | 7/2007 | Seo et al. | 429/61 |
| 2007/0279001 A1 * | 12/2007 | Tononishi | 320/112 |

FOREIGN PATENT DOCUMENTS

| | | |
|---|---|---|
| JP | 2000-268807 | 9/2000 |
| JP | 2001-093495 | 4/2001 |
| JP | 2001093495 A * | 4/2001 |
| JP | 2003-059471 | 2/2003 |
| JP | 2004-006157 | 1/2004 |
| JP | 2007-184241 | 7/2007 |
| JP | 2007-250204 | 9/2007 |
| JP | 2008-047331 | 2/2008 |
| WO | WO00/70701 | 11/2000 |
| WO | 2008-015987 | 2/2008 |

OTHER PUBLICATIONS

Japanese Office Action issued on Dec. 7, 2010, for corresponding Japanese Appl. No. 2008-095227.
Japanese Office Action for corresponding JP2008-095227 issued on Mar. 16, 2010.

(Continued)

*Primary Examiner* — Ula C Ruddock
*Assistant Examiner* — Daniel Gatewood
(74) *Attorney, Agent, or Firm* — K&L Gates LLP

(57) ABSTRACT

A battery pack is provided. The battery pack includes a nonaqueous electrolyte secondary battery that includes a substantially thin-plate-shaped battery element covered with a laminated sheet such that a positive electrode terminal and a negative electrode terminal are exposed, and has a first end face from which the positive electrode terminal and the negative electrode terminal are led out. An exterior casing covers five faces of the nonaqueous electrolyte secondary battery, the five faces excluding a second end face next to the first end face. A support covers the second end face of the nonaqueous electrolyte secondary battery. At least one of the positive electrode terminal and the negative electrode terminal is extended along a first connection portion provided for the first end face and a second connection portion provided for the second end face and is connected to an external power supply provided for the support.

13 Claims, 14 Drawing Sheets

(56) References Cited

OTHER PUBLICATIONS

Austrian Search Report for corresponding 200901654-4, issued on May 20, 2010.

Austrian Examination Report for corresponding 200901654-4, issued on May 20, 2010.

Japanese Office Action issued Jan. 10, 2012 for corresponding Japanese Appln. No. 2008-095227.

* cited by examiner

BATTERY PACK AND BATTERY-PACK EXTERIOR CASING

CROSS REFERENCES TO RELATED APPLICATIONS

The present application claims priority to Japanese Priority Patent Application JP 2008-095227 filed in the Japan Patent Office on Apr. 1, 2008, the entire content of which is hereby incorporated by reference.

BACKGROUND

The present application relates to a battery pack including a nonaqueous electrolyte secondary battery having an end face from which a positive electrode terminal and a negative electrode terminal are led out, the secondary battery being received in an exterior casing, and relates to a battery-pack exterior casing receiving the nonaqueous electrolyte secondary battery.

A battery pack used in a mobile phone includes a nonaqueous electrolyte secondary battery and an exterior casing. The nonaqueous electrolyte secondary battery includes a substantially thin-plate-shaped battery element covered with a laminated sheet such that a positive electrode terminal and a negative electrode terminal are exposed. The nonaqueous electrolyte secondary battery 11 has an end face from which the positive and negative electrode terminals are let out. The exterior casing receives the nonaqueous electrolyte secondary battery and permits the positive and negative electrode terminals to be exposed.

The battery element includes a strip positive electrode, a strip negative electrode, a separator interposed between the positive and negative electrodes, the positive electrode terminal provided for the positive electrode, and the negative electrode terminal provided for the negative electrode. The positive electrode includes a positive-electrode active material layer and a positive electrode collector such that the layer is coated with the collector. The negative electrode includes a negative-electrode active material layer and a negative electrode collector such that the layer is coated with the collector.

The strip positive and negative electrodes and the separator are wound about the line extending along the direction along the widths of the electrodes and the separator, thus constituting the battery element.

The positive-electrode active material layer coated with the positive electrode collector is a mixture of a positive-electrode active material, a conductive agent, and a binder.

The negative-electrode active material coated with the negative electrode collector is a mixture of a negative-electrode active material, a conductive agent, and a binder.

The exterior casing is a resin box which receives the nonaqueous electrolyte secondary battery and permits the positive- and negative electrode terminals to be exposed.

The nonaqueous electrolyte secondary battery is received in the exterior casing, thus constructing the battery pack.

Recently, a polymer battery pack including a metal exterior casing for improvement of resistance to an externally applied shock and reduction in thickness has been used. For example, Japanese Unexamined Patent Application Publication No. 2007-184241 discloses such a polymer battery pack.

As disclosed in Japanese Unexamined Patent Application Publication No. 2007-184241, the battery pack includes a member, serving as an exterior casing, that covers two faces of a nonaqueous electrolyte secondary battery perpendicular to the direction along the thickness thereof, and further includes two members engaged in the exterior casing so as to serve as two end faces of the casing. Disadvantageously, therefore, a space for receiving a battery element in the battery pack is restricted, leading to low volume efficiency. In addition, the number of parts is large.

The battery pack disclosed in Japanese Unexamined Patent Application Publication No. 2007-184241 has the following structural problem: Since the two members, serving as the respective end faces, are engaged in the exterior casing, engagement parts prevent an increase in volume efficiency.

SUMMARY

It is desirable to provide a battery pack with increased volume efficiency and a reduced number of parts and a battery-pack exterior casing.

According to an embodiment, a battery pack includes the following elements. A nonaqueous electrolyte secondary battery includes a substantially thin-plate-shaped battery element covered with a laminated sheet such that a positive electrode terminal and a negative electrode terminal are exposed, and has a first end face from which the positive electrode terminal and the negative electrode terminal are led out. An exterior casing covers five faces of the nonaqueous electrolyte secondary battery, the five faces excluding a second end face next to the first end face. A support covers the second end face of the nonaqueous electrolyte secondary battery. At least one of the positive electrode terminal and the negative electrode terminal is extended along a first connection portion provided for the first end face and a second connection portion provided for the second end face and is connected to an external power supply provided for the support.

At least one of the positive electrode terminal and the negative electrode terminal is extended along the first and second connection portions.

Accordingly, a contact terminal can be placed on a desired end face in the battery pack regardless of the first end face from which the electrode terminals are led out. Thus, the flexibility of designing the battery pack can be increased.

For the extension of at least one of the positive and negative electrode terminals, a space which has been left as a dead space in related art and corresponds to the first and second connection portions is used.

Consequently, the designing flexibility can be increased without reducing the volume efficiency of the nonaqueous electrolyte secondary battery.

The support may be substantially L-shaped so as to cover the second end face of the nonaqueous electrolyte secondary battery and further cover the first end face thereof.

In this case, covering the second end face and the first end face with the support can protect the extension path of at least one of the positive electrode terminal and the negative electrode terminal.

The support may be substantially C-shaped so as to cover a third end face opposite to the first end face of the nonaqueous electrolyte secondary battery.

In this case, covering the second end face and the first end face with the support can protect the extension path of at least one of the positive electrode terminal and the negative electrode terminal.

In addition, the support covers the first end face and the third end face opposite to the first end face.

Accordingly, when a protrusion for guiding the exterior casing is provided for each of side walls, corresponding to the first end face and the third end face, of the support, the nonaqueous electrolyte secondary battery can be positioned relative to the exterior casing.

The support may be substantially frame-shaped so as to surround the nonaqueous electrolyte secondary battery.

In this case, covering the second end face and the first end face with the support can protect the extension path of at least one of the positive electrode terminal and the negative electrode terminal.

In addition, the support covers the first end face and the third end face opposite to the first end face.

Accordingly, when a protrusion for guiding the exterior casing is provided for each of side walls, facing the first end face and the third end face, of the support, the nonaqueous electrolyte secondary battery can be positioned relative to the exterior casing.

The exterior casing may have a catch projecting therefrom toward the support.

Since the exterior casing has the catch projecting therefrom toward the support, the catch is buried in injected adhesive.

Accordingly, the catch functions as an anchor, thus preventing the exterior casing from being away from the support.

The support may have a recess receiving the catch.

Since the support has the recess receiving the catch, the recess can be filled with injected adhesive.

Accordingly, the catch can be effectively buried in the injected adhesive, thus further increasing the anchor effect of the catch.

The support may have a flange projecting therefrom toward the inside of the exterior casing, the flange having a through-hole extending therethrough in the thickness direction thereof.

In this case, the through-hole of the flange is filled with injected adhesive, so that the flange can be effectively fixed with the adhesive.

Consequently, the flange serves as an anchor, thus preventing the support from being away from the exterior casing.

According to another embodiment, there is provided a battery-pack exterior casing covering a substantially thin-plate-shaped nonaqueous electrolyte secondary battery including a battery element covered with a laminated sheet. The exterior casing is formed in a box shape so as to cover five faces of the nonaqueous electrolyte secondary battery by folding a single plate-shaped member, the five faces including a first end face from which a positive electrode terminal and a negative electrode terminal are led out.

The exterior casing is box-shaped so as to cover the five faces (including the first end face from which the positive and negative electrode terminals are led out) of the nonaqueous electrolyte secondary battery.

Since the exterior casing is box-shaped, the exterior casing has no engagement parts, thus increasing the volume efficiency.

In addition, since the single plate-shaped member is folded to form the box-shaped exterior casing, the number of parts can be reduced. Furthermore, the thickness of the plate-shaped member to be subjected to drawing can be reduced, thus resulting in a reduction in cost.

The exterior casing may have a catch projecting inward.

Since the exterior casing has the catch projecting inward, the catch is buried in injected adhesive.

Accordingly, the catch functions as an anchor, thus preventing the exterior casing from being away from the nonaqueous electrolyte secondary battery.

The exterior casing may have a slit extending in the direction in which the nonaqueous electrolyte secondary battery is inserted into the exterior casing.

Since the exterior casing has the slit extending in the direction in which the nonaqueous electrolyte secondary battery is inserted into the exterior casing, the slit is used upon inserting the nonaqueous electrolyte secondary battery into the exterior casing, thus achieving the positioning of the nonaqueous electrolyte secondary battery relative to the exterior casing.

The exterior casing may have a folded portion provided in the vicinity of an insertion opening through which the nonaqueous electrolyte secondary battery is inserted into the exterior casing.

Since the exterior casing has the folded portion in the vicinity of the insertion opening, the folded portion is buried in injected adhesive.

Accordingly, the folded portion serves as an anchor, thus preventing the exterior casing from being away from the nonaqueous electrolyte secondary battery.

The exterior casing may have an inlet for injection of adhesive.

Since the exterior casing has the inlet, adhesive can be effectively injected into the casing.

The battery pack according to the foregoing embodiment has the advantage that a contact terminal can be placed on a desired end face by extending at least one of the positive and negative electrode terminals along the first and second connection portions, thus increasing the flexibility of designing the battery pack.

The battery pack further has the advantage that the extension can be achieved in a space corresponding to the first and second connection portions, thus increasing the designing flexibility without reducing the volume efficiency of the nonaqueous electrolyte secondary battery.

The battery-pack exterior casing according to the above-described embodiment has the advantage that the exterior casing has no engagement parts because the exterior casing is formed in a box shape, thus increasing the volume efficiency.

The exterior casing further has the advantages that the number of parts can be reduced because the single plate-shaped member is folded to form the box-shaped exterior casing, and the thickness of the plate-shaped member to be subjected to drawing can be reduced, thus resulting in a reduction in cost.

Additional features and advantages are described herein, and will be apparent from the following Detailed Description and the figures.

DETAILED DESCRIPTION

A battery pack and a battery-pack exterior casing according to an embodiment will now be described in greater detail with reference to the drawings.

Figure 1A:
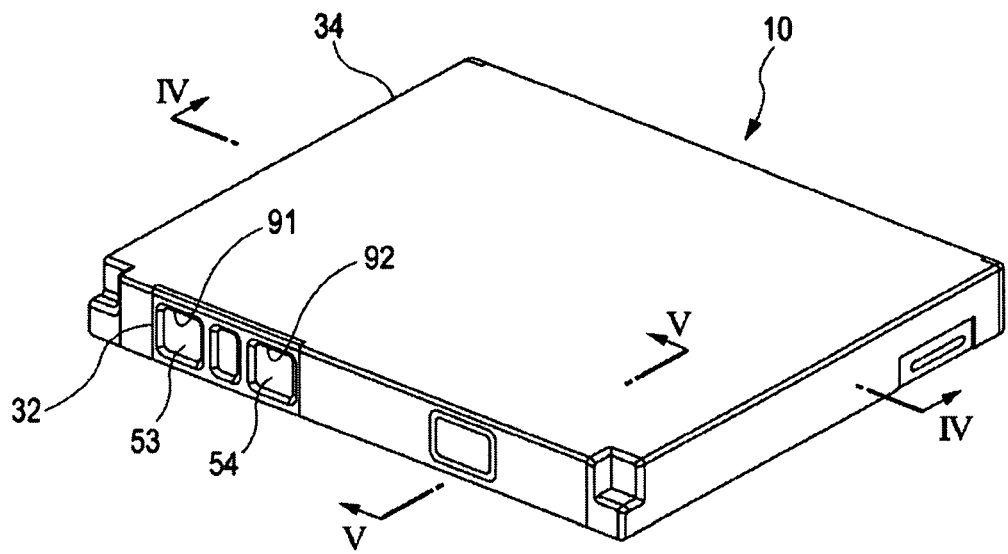
FIG. 1A is a perspective view of a battery pack according to an embodiment of the present application as viewed from above.
Figure 1B:
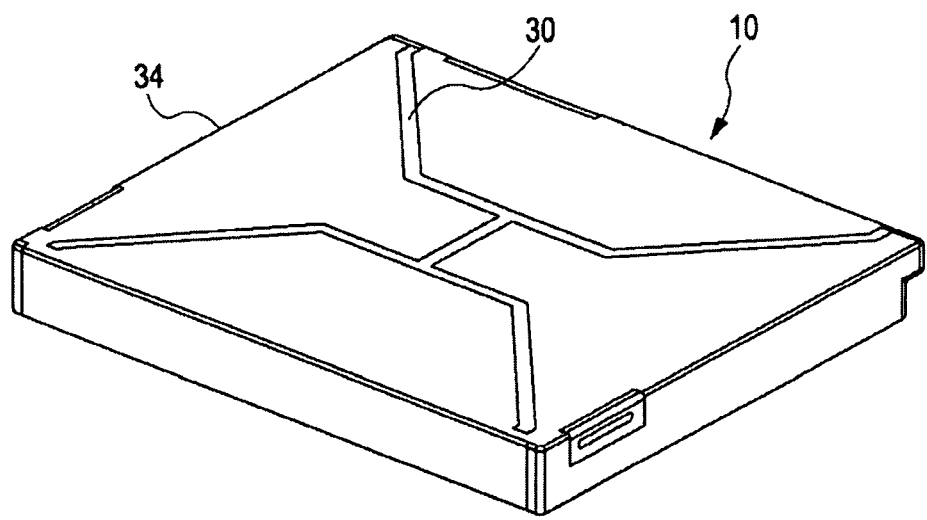
FIG. 1B is a perspective view of the battery pack as viewed from below.
Figure 2:
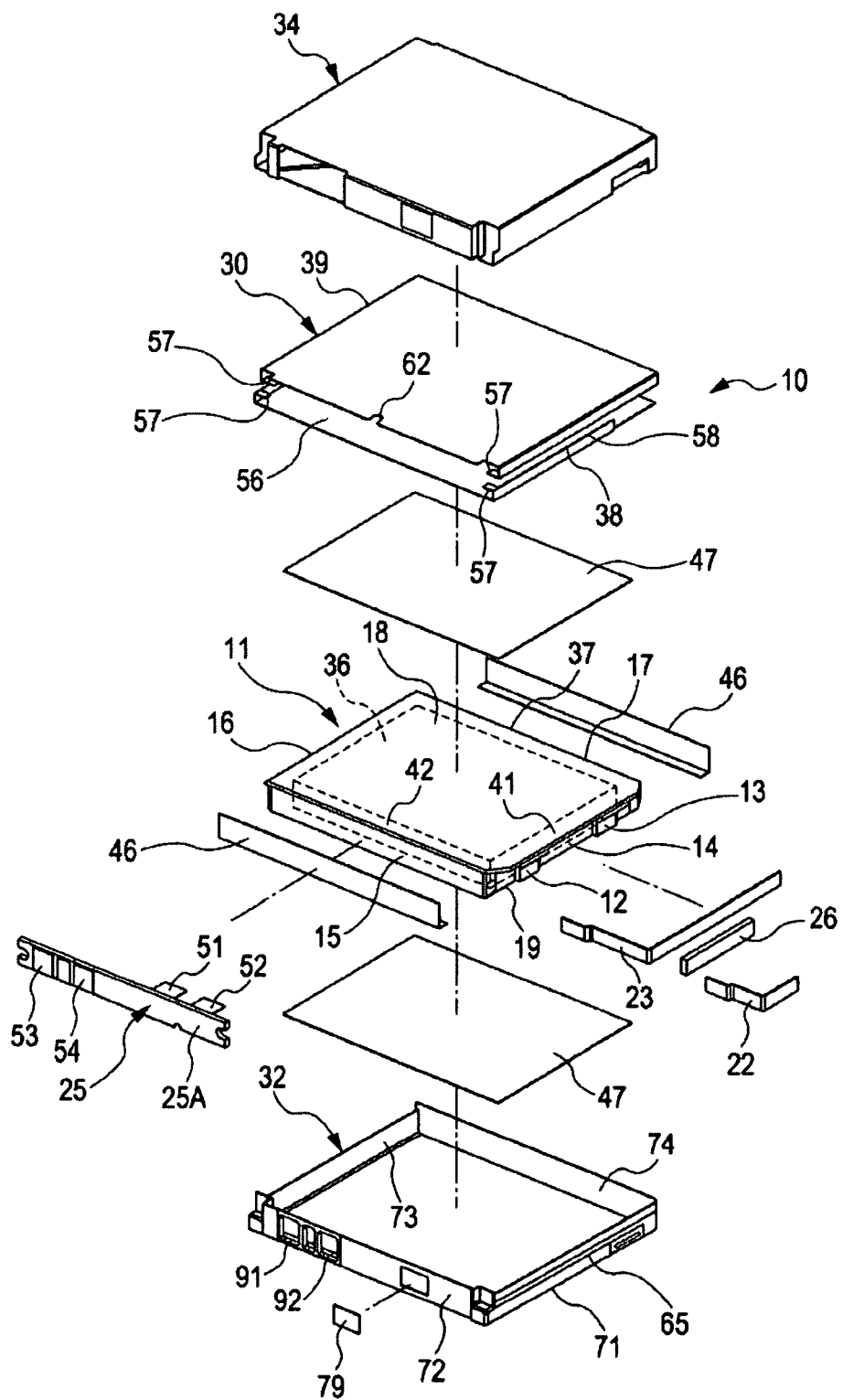
FIG. 2 is an exploded perspective view of the battery pack according to the embodiment.

Referring to FIGS. 1A, 1B, and 2, a battery pack 10 according to an embodiment includes a substantially thin-plate-shaped nonaqueous electrolyte secondary battery 11, a first printed circuit board (positive and negative electrode terminals) 25, a second printed circuit board (the negative electrode terminal) 26, an exterior casing 30, a support 32, and a label 34. The nonaqueous electrolyte secondary battery 11 has a first end face 14 from which a negative electrode lead (the negative electrode terminal) 12 and a positive electrode lead (the positive electrode terminal) 13 are led out. The first printed circuit board 25 is connected to the negative electrode lead 12 through a negative-electrode intermediate tab (the negative electrode terminal) 22 and is connected to the positive electrode lead 13 through a positive-electrode intermediate tab (the positive electrode terminal) 23. The second printed circuit board 26 is interposed between the negative electrode lead 12 and the negative-electrode intermediate tab 22. The exterior casing 30 covers the first end face 14 and other faces 16 to 19 excluding a second end face 15 next to the first end face 14. The support 32 covers the second end face 15 of the nonaqueous electrolyte secondary battery 11. The label 34 covers the exterior casing 30 and the support 32.

Referring to FIG. 2, the nonaqueous electrolyte secondary battery 11 includes a battery element 36 and a laminated sheet 37, the battery element 36 being covered with the laminated sheet 37 such that the negative electrode lead 12 and the positive electrode lead 13 are exposed.

The substantially thin-plate-shaped nonaqueous electrolyte secondary battery 11 has the first end face 14 from which the exposed negative and positive electrode leads 12 and 13 are led out, the second end face 15 next to the first end face 14, and the other four faces 16 to 19.

The nonaqueous electrolyte secondary battery 11 has a first connection portion 41 provided for the first end face 14 and a second connection portion 42 provided for the second end face 15.

The negative electrode lead 12 and the positive electrode lead 13 led out from the first end face 14 are connected to the first printed circuit board 25 through the negative-electrode intermediate tab 22 and the positive-electrode intermediate tab 23, respectively.

The second printed circuit board 26 is interposed between the negative electrode lead 12 and the negative-electrode intermediate tab 22.

The negative electrode lead 12, the positive electrode lead 13, the negative-electrode intermediate tab 22, the positive-electrode intermediate tab 23, the first printed circuit board 25, and the second printed circuit board 26 are arranged so as to extend the positive and negative electrode terminals along the first connection portion 41 provided for the first end face 14 and the second connection portion 42 provided for the second end face 15.

Accordingly, a contact terminal can be placed on a desired end face, corresponding to the end face 15, in the battery pack 10 regardless of the first end face 14 from which the negative electrode lead 12 and the positive electrode lead 13 of the nonaqueous electrolyte secondary battery 11 are led out. Thus, the flexibility of designing the battery pack 10 can be increased.

A positive electrode 53 and a negative electrode 54 of the first printed circuit board 25 placed along the second connection portion 42 are connected to an external power supply (not illustrated) provided for the support 32.

Figure 4:
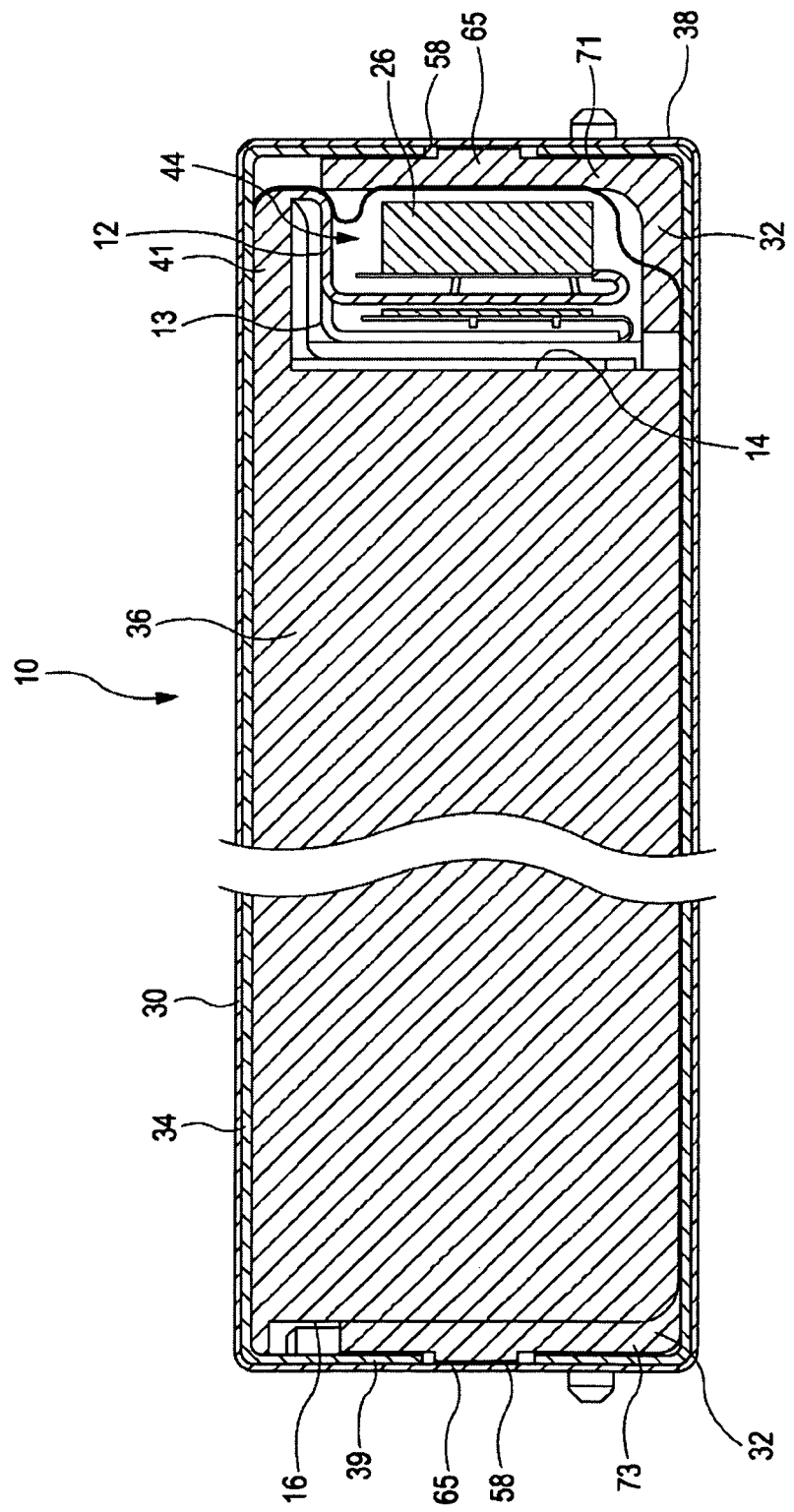
FIG. 4 is a cross-sectional view of the battery pack taken along the line IV-IV in FIG. 1.

Referring to FIG. 4, in the nonaqueous electrolyte secondary battery 11, the positive electrode lead 13 and the negative electrode lead 12 are bent along the first connection portion 41 and the first end face 14.

In this state, the positive electrode lead 13, the negative electrode lead 12, and the second printed circuit board 26 are arranged in a space (so-called "terrace") 44 formed by the first connection portion 41 and the first end face 14.

The space 44 corresponds to a dead space which has not been used in related art. Therefore, the positive electrode lead 13, the negative electrode lead 12, and the second printed circuit board 26 are arranged in the space 44, so that the designing flexibility can be increased without reducing the battery volume efficiency.

Referring to FIG. 2, a protective tape 46 is attached to each of the second end face 15 and the fourth end face 17 of the nonaqueous electrolyte secondary battery 11. A double-faced tape 47 is attached to each of the fifth end face 18 and the sixth end face 19.

The double-faced tape 47 is used to bond the fifth end face 18 and the sixth end face 19 to the exterior casing 30.

Referring to FIG. 2, the first printed circuit board 25 has a positive electrode projection 51 and a negative electrode projection 52 such that the projections project inward from the rear face of the first printed circuit board 25. The positive electrode 53 connected to the positive electrode projection 51 is exposed on a face 25A of the first printed circuit board 25 and the negative electrode 54 connected to the negative electrode projection 52 is exposed on the face 25A.

The positive electrode 53 is connected through the positive-electrode intermediate tab 23 to the positive electrode lead 13.

The negative electrode 54 is connected through the negative-electrode intermediate tab 22 to the negative electrode lead 12.

Figure 5A:
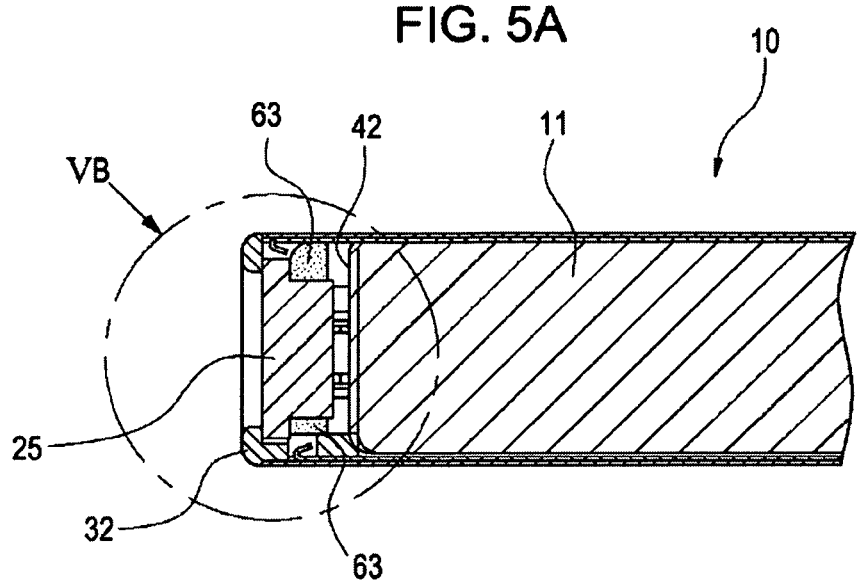
FIG. 5A is a cross-sectional view of the battery pack taken along the line V-V in FIG. 1.
Figure 5B:
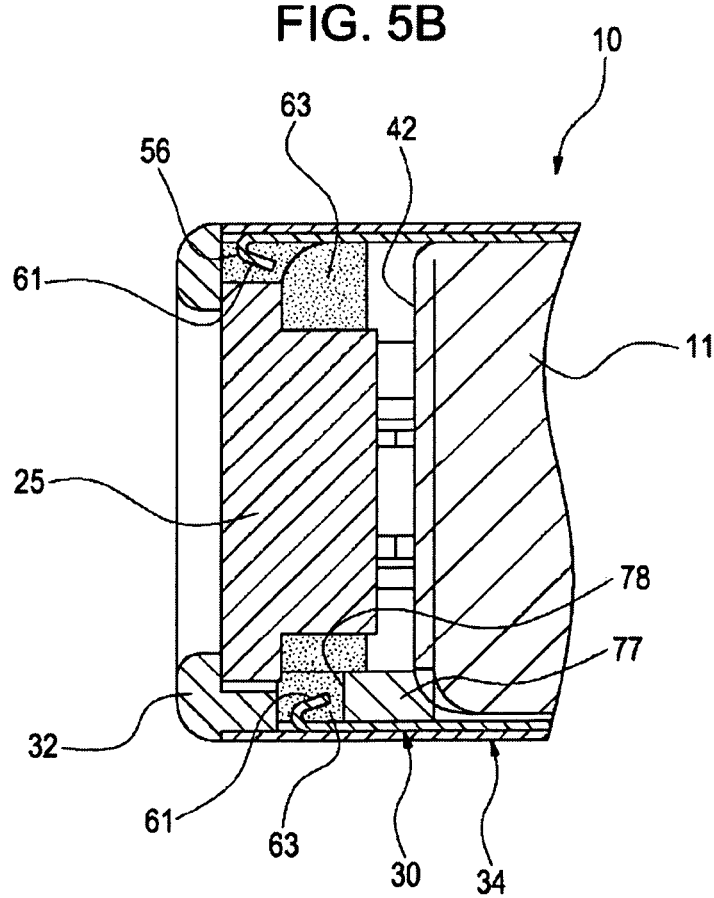
FIG. 5B is an enlarged view of part VB in FIG. 5A.

Referring to FIGS. 5A and 5B, the second connection portion 42 of the nonaqueous electrolyte secondary battery 11 is bent so as to come into contact with the second end face 15 and the first printed circuit board 25 is placed so as to face the second connection portion 42.

Figure 3A:
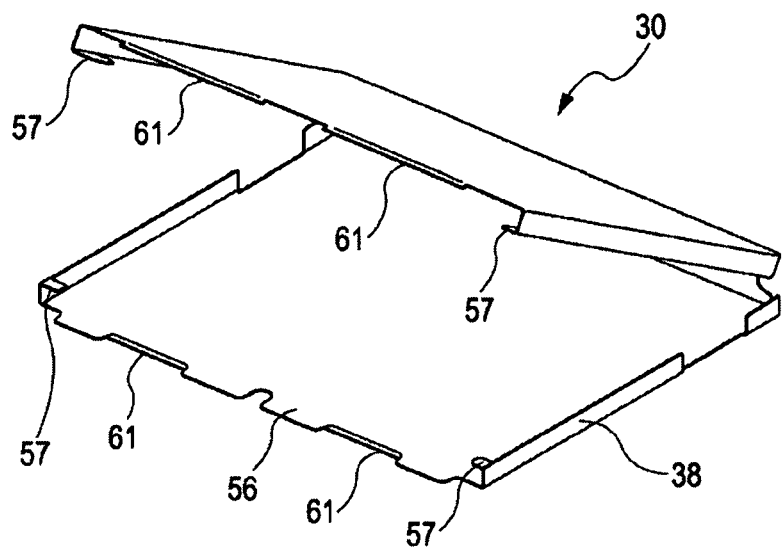
FIG. 3A is a perspective view of an exterior casing of the battery pack according to the embodiment as viewed from the side of an insertion opening of the exterior casing.
Figure 3B:
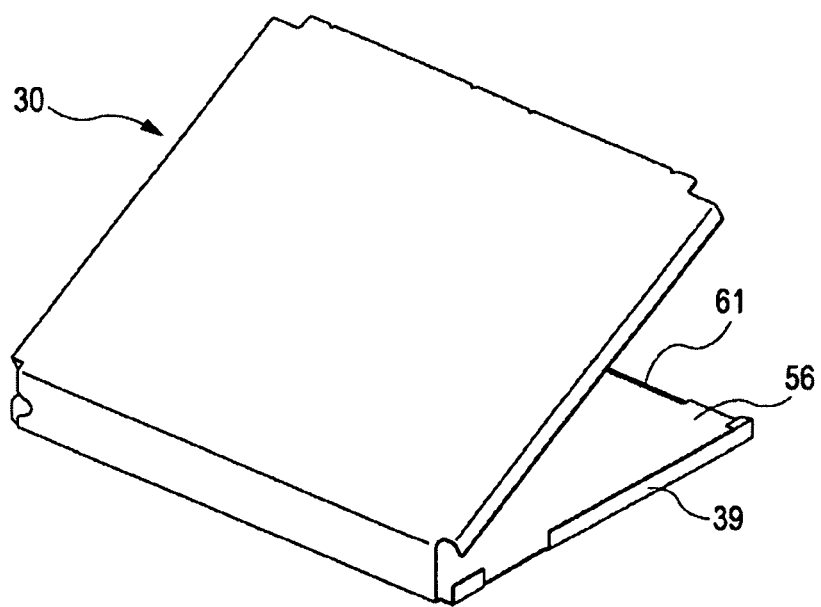
FIG. 3B is a perspective view of the exterior casing as viewed from the rear side thereof.

Referring to FIGS. 2, 3A, and 3B, the exterior casing 30 is a casing, made of metal (e.g., aluminum or steel), covering the five faces 14 and 16 to 19 excluding the second end face 15 next to the first end face 14 in the nonaqueous electrolyte secondary battery 11.

The exterior casing 30 is shaped in a substantially rectangular box by folding a single plate-shaped member in two. The exterior casing 30 has a first wall portion 38 and a third wall portion 39, the first wall portion 38 facing a first side wall 71 of the support 32, the third wall portion 39 facing a third side wall 73 thereof.

Since the exterior casing 30 is box-shaped, the exterior casing 30 has no engagement parts, leading to increased volume efficiency.

In addition, since the single plate-shaped member is folded to form the box-shaped exterior casing 30, the number of parts can be reduced. Furthermore, the thickness of the plate-shaped member to be subjected to drawing can be reduced, thus resulting in a reduction in cost.

The exterior casing 30 has an insertion opening 56, through which the nonaqueous electrolyte secondary battery 11 is inserted, and catches 57 (see FIG. 6B) projecting toward the support 32 (i.e., projecting inward) from the side walls 38 and 39. The exterior casing 30 further has slits 58 (refer to FIG. 4) facing the first end face 14 and the third end face 16, respectively. Each slit 58 extends in the insertion direction in which the nonaqueous electrolyte secondary battery 11 is inserted into the casing. The exterior casing 30 further has folded portions 61 in the vicinity of the insertion opening 56 and an inlet 62 for injection of adhesive 63 (see FIG. 5B) into the battery pack 10.

Figure 6A:
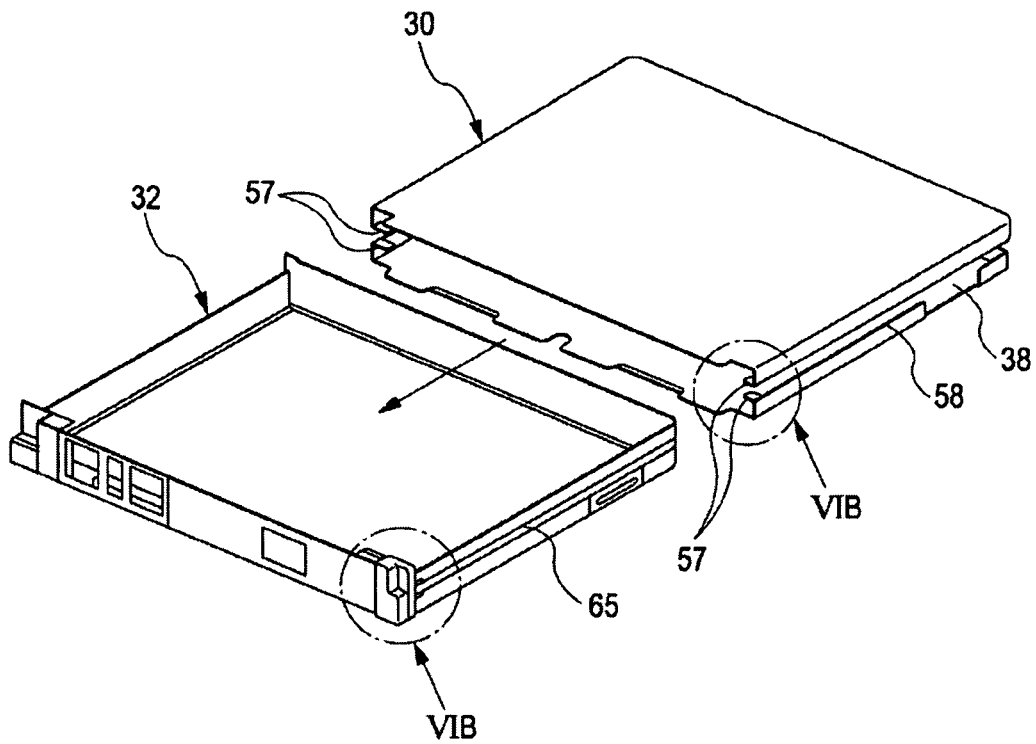
FIG. 6A is a perspective view of the battery pack according to the embodiment, FIG. 6A illustrating a state before fitting the exterior casing.
Figure 6B:
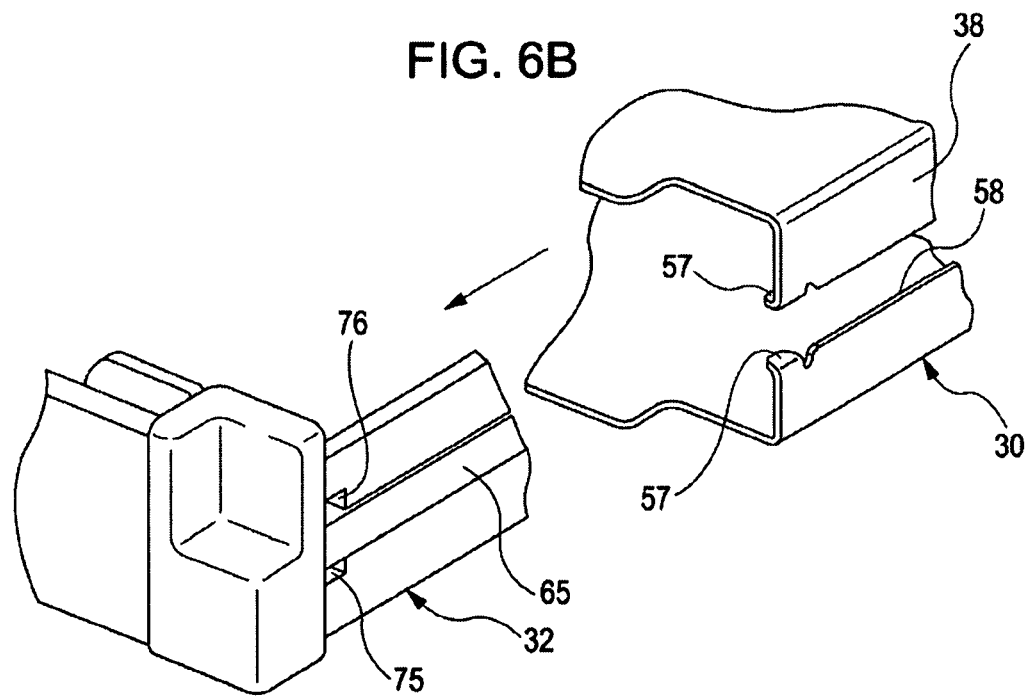
FIG. 6B is an enlarged view of parts VIB in FIG. 6A.

As for the catches 57, referring to FIGS. 6A and 6B, one pair of catches 57 are vertically arranged in the first wall portion 38 such that the catches 57 are located in the end of the insertion opening 56 and the other pair of catches 57 are vertically arranged in the third wall portion 39 such that the catches 57 are located in the end of the insertion opening 56.

The catches 57 project inward from the exterior casing 30. The catches 57 are therefore buried in the injected adhesive 63 (refer to FIGS. 5A and 5B).

Consequently, the catches 57 each function as an anchor to prevent the exterior casing 30 from being away from the support 32.

The slits 58 are arranged in the first wall portion 38 and the third wall portion 39, respectively, as shown in FIGS. 2 and 4. The slits 58 extend in the insertion direction in which the nonaqueous electrolyte secondary battery 11 is inserted.

The slits 58 serve as members that engage with protrusions 65 of the support 32 to position the nonaqueous electrolyte secondary battery 11 relative to the exterior casing 30. The protrusions 65 will be described later.

The folded portions 61 are folded inward in the vicinity of the insertion opening 56 as shown in FIGS. 5A and 5B. Accordingly, the folded portions 61 are buried in the injected adhesive 63.

Consequently, the folded portion 61 each function as an anchor, thus preventing the exterior casing 30 from being away from the support 32.

Referring to FIG. 2, the support 32 is substantially frame-shaped and includes the first side wall 71, a second side wall 72, the third side wall 73, and a fourth side wall 74 so as to surround the nonaqueous electrolyte secondary battery 11.

In the support 32, the second side wall 72 covers the second end face 15, the first side wall 71 covers the first end face 14, the third side wall 73 covers the third end face 16 opposite to the first end face 14, and the fourth side wall 74 covers the fourth end face 17.

The second side wall 72 is exposed while being received in the exterior casing 30. The second side wall 72 is provided with the external power supply (not illustrated).

The support 32 has recesses 76 (refer to FIGS. 6A and 6B) in which the catches 57 of the exterior casing 30 are received, respectively. The support 32 further has a flange 77 (see FIG. 7) projecting from the support 32 toward the inside of the exterior casing 30. The flange 77 has a through-hole 78 (refer to FIG. 7) extending therethrough in the thickness direction.

Since the support 32 has the recesses 76 for receiving the catches 57 of the exterior casing 30, the recesses 76 are filled with the injected adhesive 63.

Consequently, the catches 57 can be reliably buried in the injected adhesive 63, so that the anchor effects of the catches 57 can be further increased.

Figure 7:
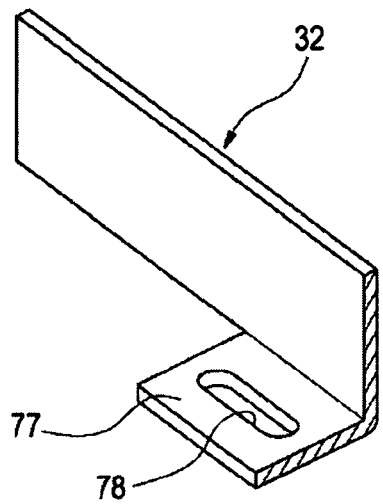
FIG. 7 is a perspective view of a flange and a through-hole in the battery pack according to the embodiment.

Referring to FIG. 7, the support 32 has the flange 77 (also refer to FIG. 5B) extending therefrom toward the inside of the exterior casing 30 and the through-hole 78 (see FIG. 5B) extending through the flange 77 in the thickness direction of the flange 77.

Accordingly, the through-hole 78 of the flange 77 is filled with the injected adhesive 63, so that the flange 77 can be effectively fixed with the adhesive 63.

Consequently, the flange 77 functions as an anchor, thus preventing the support 32 from being away from the exterior casing 30.

Referring to FIG. 4, the support 32 has the protrusions 65, which are engaged with the respective slits 58 of the exterior casing 30, in the first side wall 71 and the third side wall 73, respectively.

When the nonaqueous electrolyte secondary battery 11 received in the support 32 is inserted into the exterior casing 30, the protrusions 65 are engaged with the respective slits 58, so that the nonaqueous electrolyte secondary battery 11 can be positioned relative to the exterior casing 30.

Referring to FIG. 2, a submergence-sensitive sticker 79 is attached to the second side wall 72 of the support 32.

Figure 8:
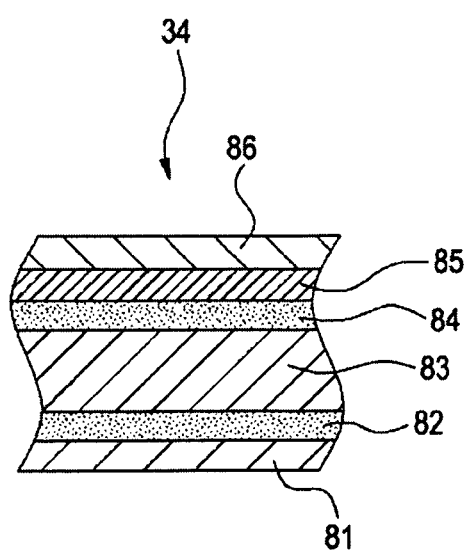
FIG. 8 is a cross-sectional view of a label of the battery pack according to the embodiment.

Referring to FIG. 8, the label 34 includes, in series, a silicone impregnated release paper 81, an adhesive layer (matrix) 82, BPET 83, ink adhesive 84, ink 85, and UV coating 86.

A process for assembling the parts into the battery pack 10 will now be described with reference to FIGS. 9A to 12C.

Figure 9A:
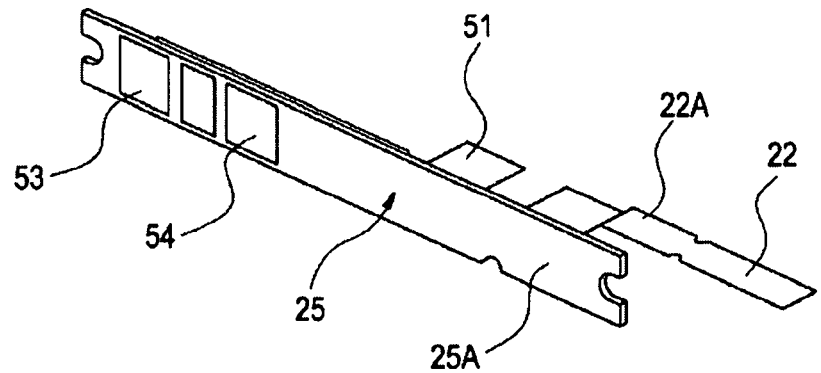
FIGS. 9A to 9C are perspective views explaining steps of welding a positive electrode lead and a negative electrode lead to a first printed circuit board in the battery pack according to the embodiment.

Referring to FIG. 9A, one end 22A of the negative-electrode intermediate tab 22 is welded to the negative electrode projection 52 (see FIG. 2) of the first printed circuit board 25.

Figure 9B:
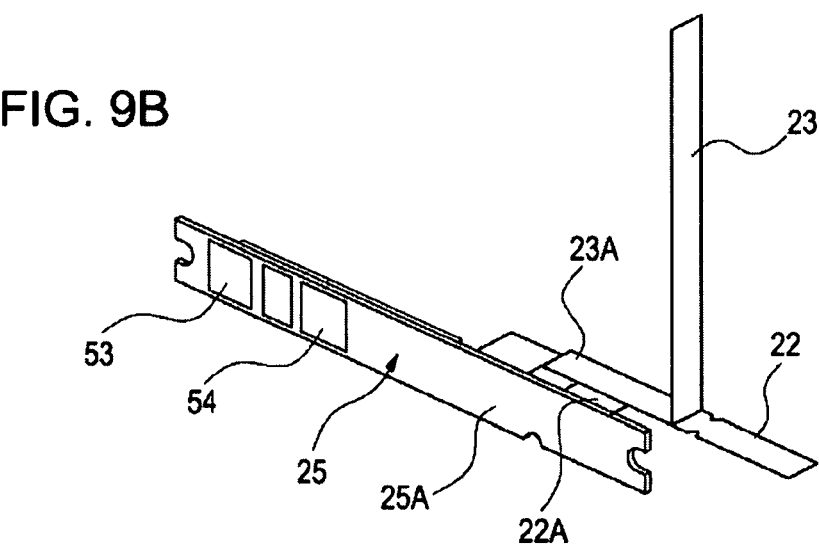

Referring to FIG. 9B, one end 23A of the positive-electrode intermediate tab 23 is welded to the positive electrode projection 51 (see FIG. 2) of the first printed circuit board 25.

Figure 9C:
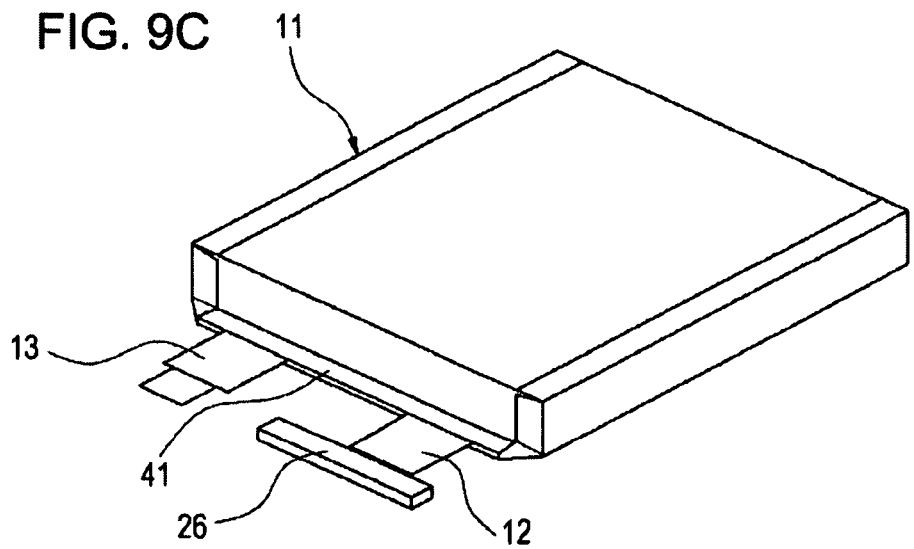

Referring to FIG. 9C, the second printed circuit board 26 is welded to the negative electrode lead 12 of the nonaqueous electrolyte secondary battery 11.

Figure 10A:
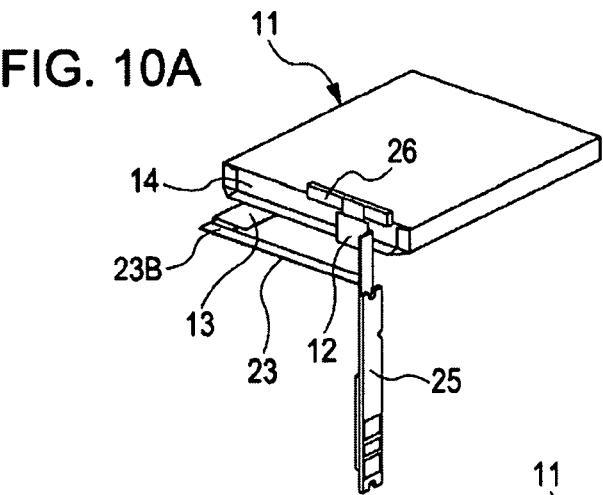
FIG. 10A to 10C are perspective views explaining steps of placing the first printed circuit board onto a second end face of a nonaqueous electrolyte secondary battery in the battery pack according to the embodiment.

Referring to FIG. 10A, the negative electrode lead 12 is bent upward by substantially 90 degrees. The other end 23B of the positive-electrode intermediate tab 23 is crimped to the positive electrode lead 13.

Since the negative electrode lead 12 is bent upward by substantially 90 degrees, the positive electrode lead 13 can be prevented from coming into contact with the negative electrode lead 12.

Figure 10B:
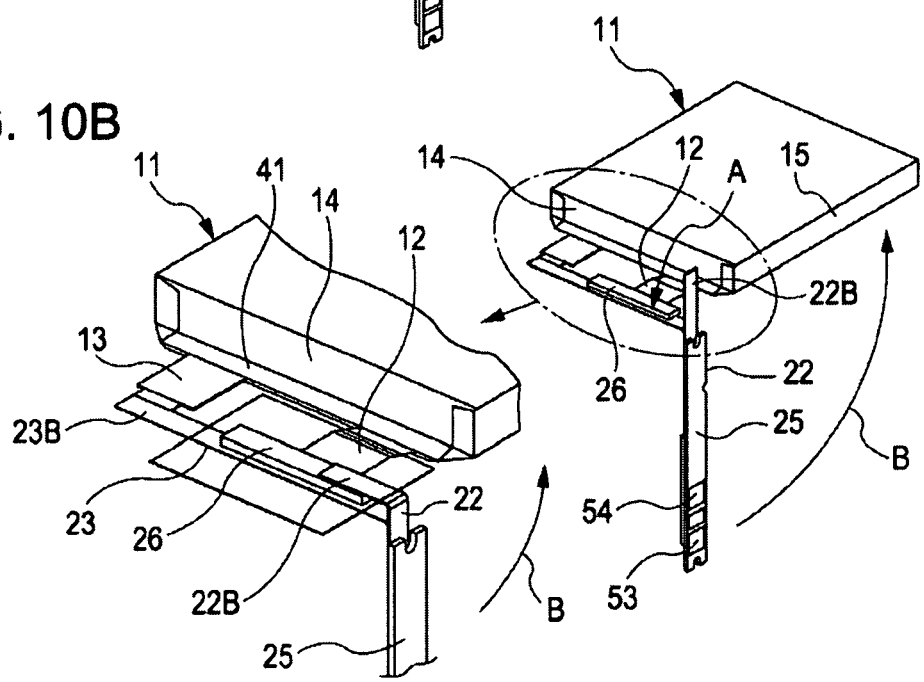

Referring to FIG. 10B, the negative electrode lead 12 is unbent to its original state and the negative-electrode intermediate tab 22 is bent up to the second printed circuit board 26 in the direction indicated by the arrow A.

The other end 22B of the bent negative-electrode intermediate tab 22 is welded to the second printed circuit board 26.

After welding, an anti-short tape is attached to the negative-electrode intermediate tab 22 and the second printed circuit board 26.

The first printed circuit board 25 is bent in the direction indicated by the arrow B.

Figure 10C:
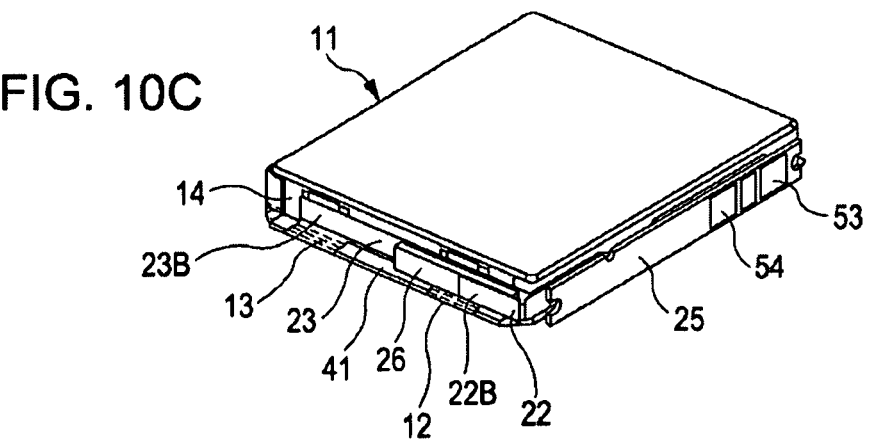

Referring to FIG. 10C, the positive electrode lead 13 and the negative electrode lead 12 are folded along the first connection portion 41 and the first end face 14.

In this state, the first printed circuit board 25 is placed on the second end face 15 (refer to FIG. 10B).

The positive electrode 53 and the negative electrode 54 are exposed on the face 25A of the first printed circuit board 25.

Figure 11A:
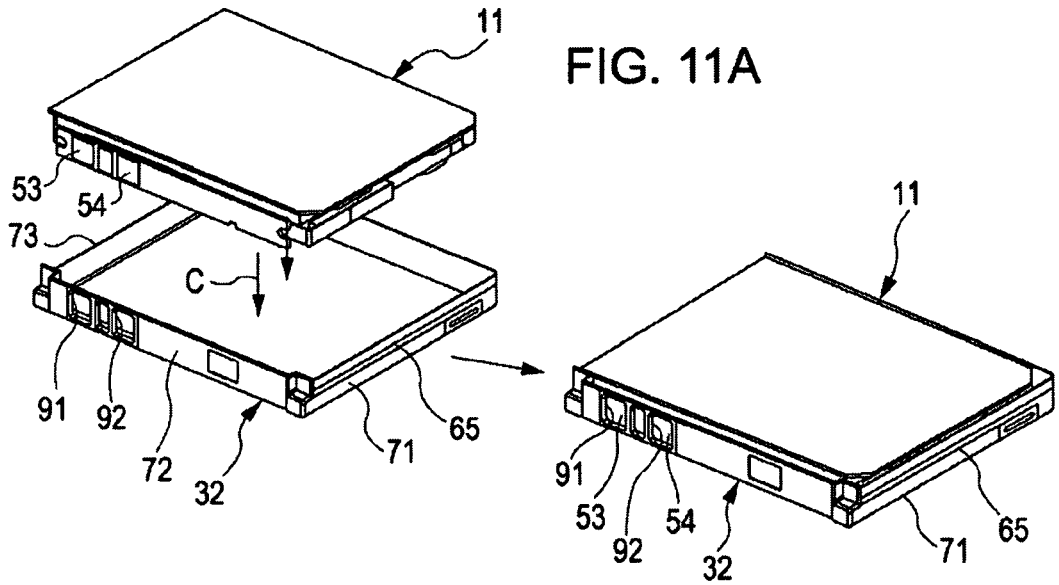
FIGS. 11A to 11C are perspective views explaining steps of placing the nonaqueous electrolyte secondary battery into the exterior casing in the battery pack according to the embodiment.

Referring to FIG. 11A, the nonaqueous electrolyte secondary battery 11 is received into the support 32 as indicated by the arrow C.

In this state, the positive electrode 53 and the negative electrode 54 on the first printed circuit board 25 are exposed from a positive electrode aperture 91 and a negative electrode aperture 92 of the support 32, respectively.

Figure 11B:
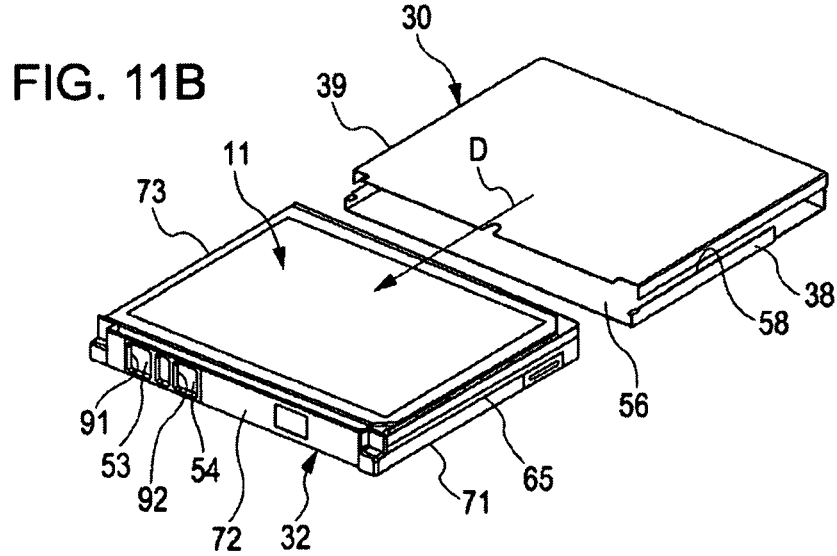

Referring to FIG. 11B, the exterior casing 30 is fitted onto the nonaqueous electrolyte secondary battery 11 received in the support 32 in the direction indicated by the arrow D.

In the support 32, the first side wall 71 and the third side wall 73 each have the protrusion 65.

In the exterior casing 30, the first wall portion 38 and the third wall portion 39 each have the slit 58 extending in the insertion direction in which the nonaqueous electrolyte secondary battery 11 is inserted into the exterior casing 30.

Accordingly, when the nonaqueous electrolyte secondary battery 11 (i.e., the support 32) is inserted into the exterior casing 30, the protrusions 65 are engaged with the respective slits 58, so that the nonaqueous electrolyte secondary battery 11 (i.e., the support 32) can be positioned relative to the exterior casing 30.

Figure 11C:
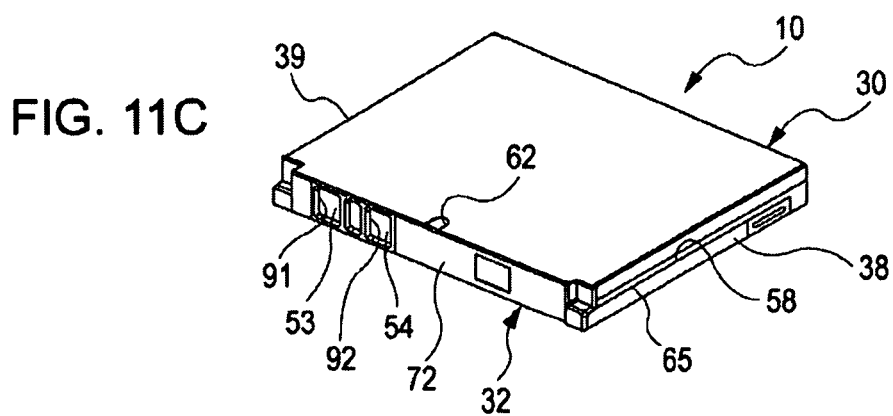

Referring to FIG. 11C, while the exterior casing 30 is fitted on the nonaqueous electrolyte secondary battery 11, the second side wall 72 of the support 32 is exposed.

Accordingly, the positive electrode 53 and the negative electrode 54 on the first printed circuit board 25 are exposed from the positive electrode aperture 91 and the negative electrode aperture 92 of the support 32, respectively.

The adhesive 63 (refer to FIG. 5B) is injected into the battery pack 10 through the inlet 62 of the exterior casing 30.

Figure 12A:
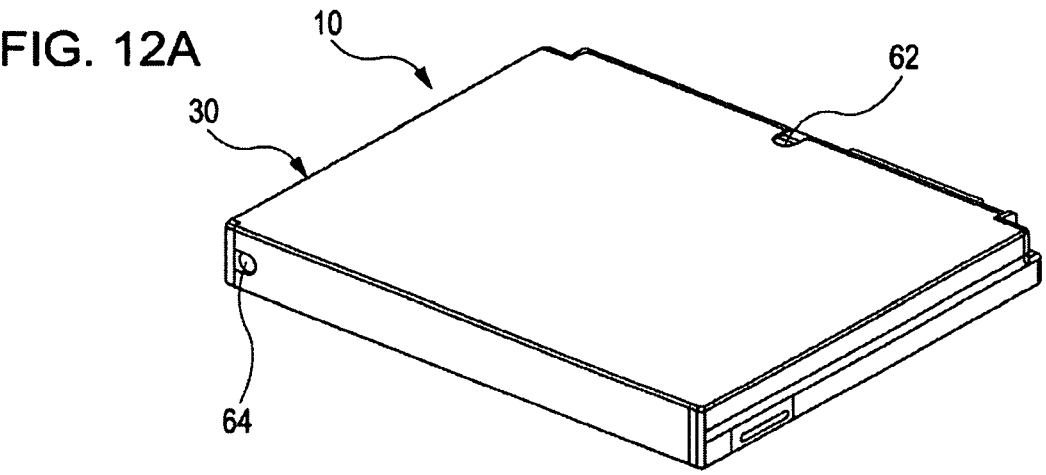
FIGS. 12A to 12C are perspective views explaining steps of covering the exterior casing of the battery pack according to the embodiment with the label.

Referring to FIG. 12A, the adhesive 63 (see FIG. 5B) is similarly injected into the battery pack 10 through an inlet 64 of the exterior casing 30.

Since the inlets 62 and 64 are arranged in the exterior casing 30, the adhesive 63 can be effectively injected into the exterior casing 30.

Figure 12B:
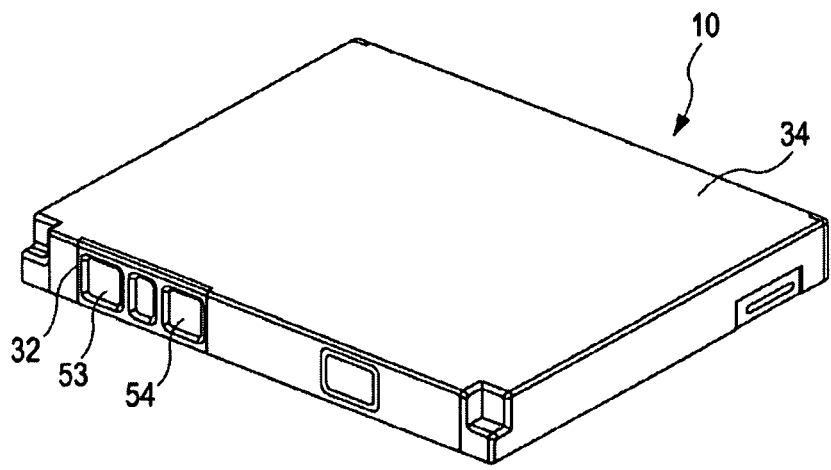
Figure 12C:
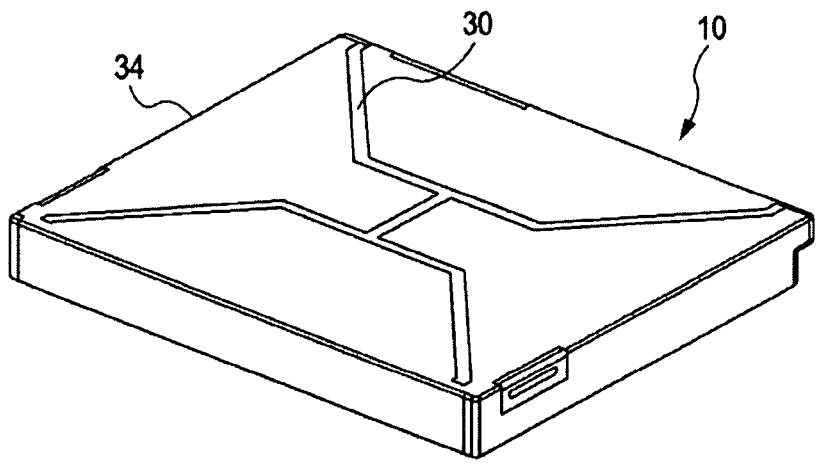

Referring to FIGS. 12B and 12C, the entire surface of the exterior casing 30 is wrapped with the label 34, thus completing the assembly of the battery pack 10.

Battery packs according to first to third modifications of the above-described embodiment will now be described with reference to schematic diagrams in FIGS. 13 to 15. In the battery pack according to each of the first to third modifications, the same components as those of the battery pack 10 according to the foregoing embodiment are designated by the same reference numerals and description of these components is omitted.

First Modification

Figure 13:
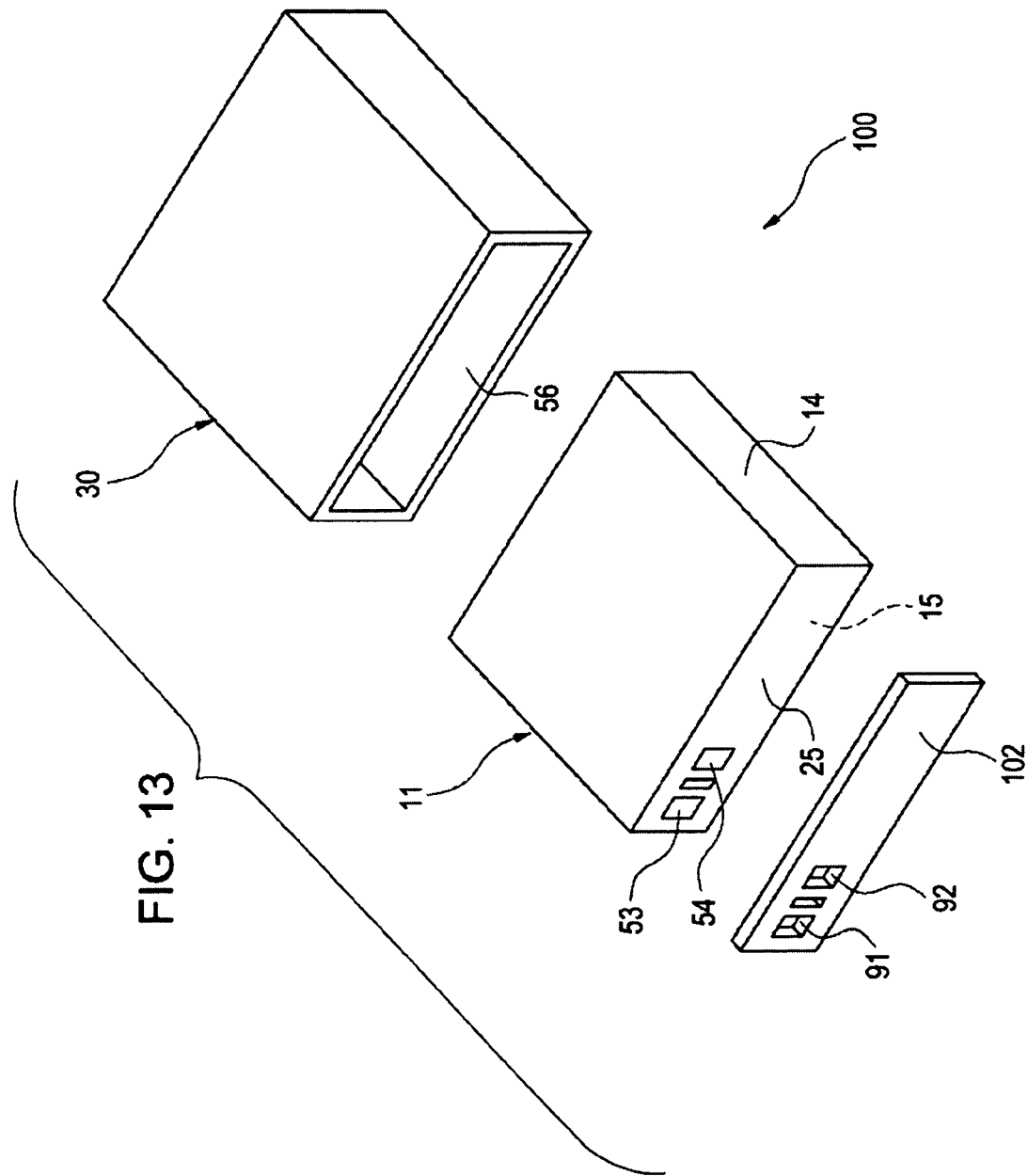
FIG. 13 is an exploded perspective view of a battery pack according to a first modification of the embodiment.

FIG. 13 illustrates a battery pack 100 according to the first modification. The battery pack 100 includes a support 102 instead of the support 32 in the embodiment. The other components of the battery pack 100 are the same as those of the battery pack 10 according to the embodiment.

The support 102 is substantially I-shaped so as to cover the second end face 15 (specifically, the first printed circuit board 25) of the nonaqueous electrolyte secondary battery 11.

Covering the second end face 15 (specifically, the first printed circuit board 25) with the support 102 can protect the extension path of at least one of the positive electrode terminal and the negative electrode terminal.

In other words, the battery pack 100 according to the first modification can provide the same advantages as those of the battery pack 10 according to the embodiment.

The exterior casing 30 may be formed by bending a single plate-shaped member. Alternatively, the exterior casing 30 may be formed by drawing.

Second Modification

Figure 14:
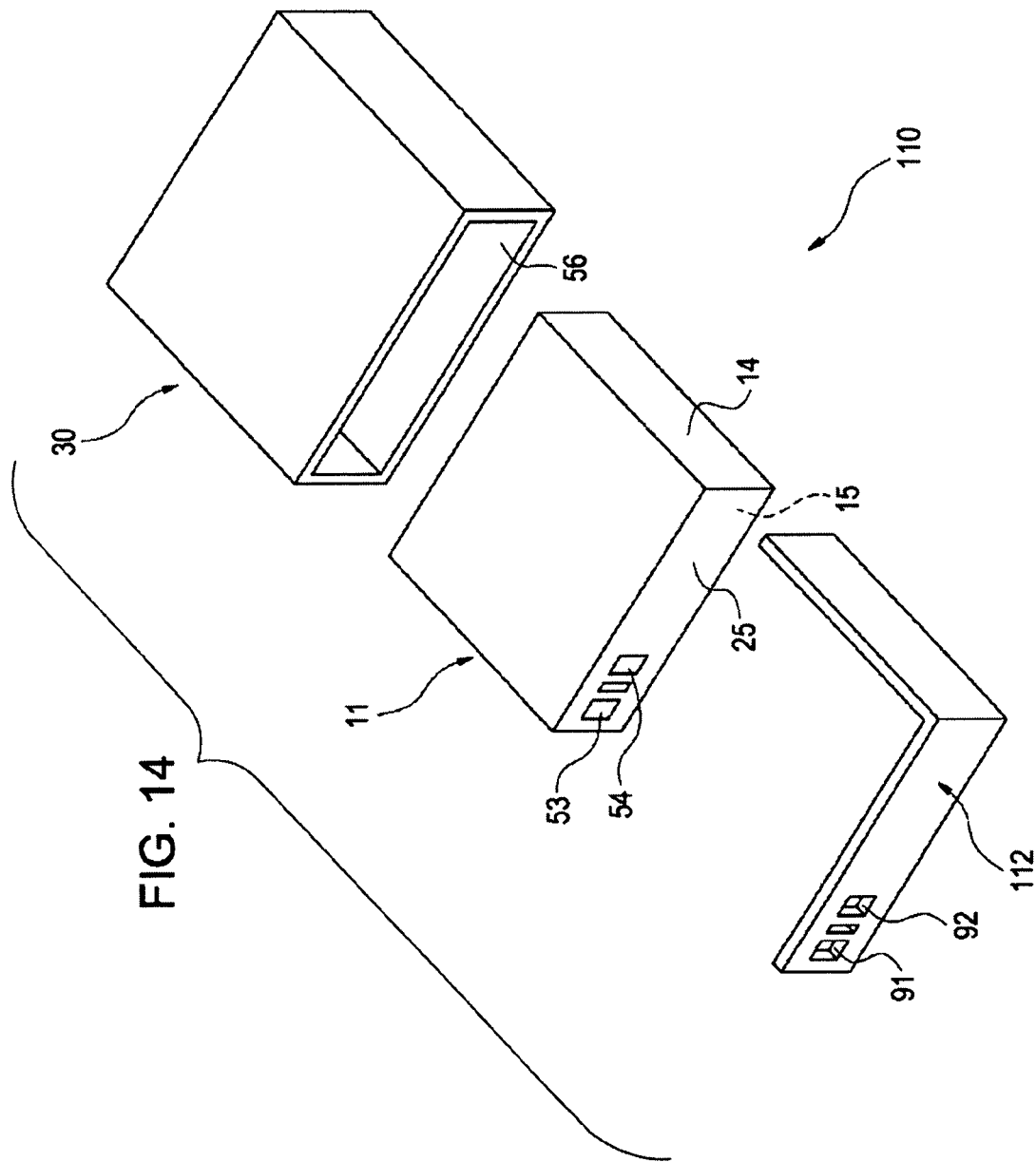
FIG. 14 is an exploded perspective view of a battery pack according to a second modification of the embodiment.

FIG. 14 illustrates a battery pack 110 according to the second modification. The battery pack 110 includes a support 112 instead of the support 32 in the embodiment. The other components of the battery pack 110 are the same as those of the battery pack 10 according to the embodiment.

The support 112 is substantially L-shaped so as to cover the second end face 15 (specifically, the first printed circuit board 25) of the nonaqueous electrolyte secondary battery 11 and further cover the first end face 14 thereof.

Covering the second end face 15 (specifically, the first printed circuit board 25) and the first end face 14 with the support 112 can protect the extension path of at least one of the positive electrode terminal and the negative electrode terminal.

In other words, the battery pack 110 according to the second modification can provide the same advantages as those of the battery pack 10 according to the embodiment.

The exterior casing 30 may be formed by bending a single plate-shaped member. Alternatively, the exterior casing 30 may be formed by drawing.

Third Modification

Figure 15:
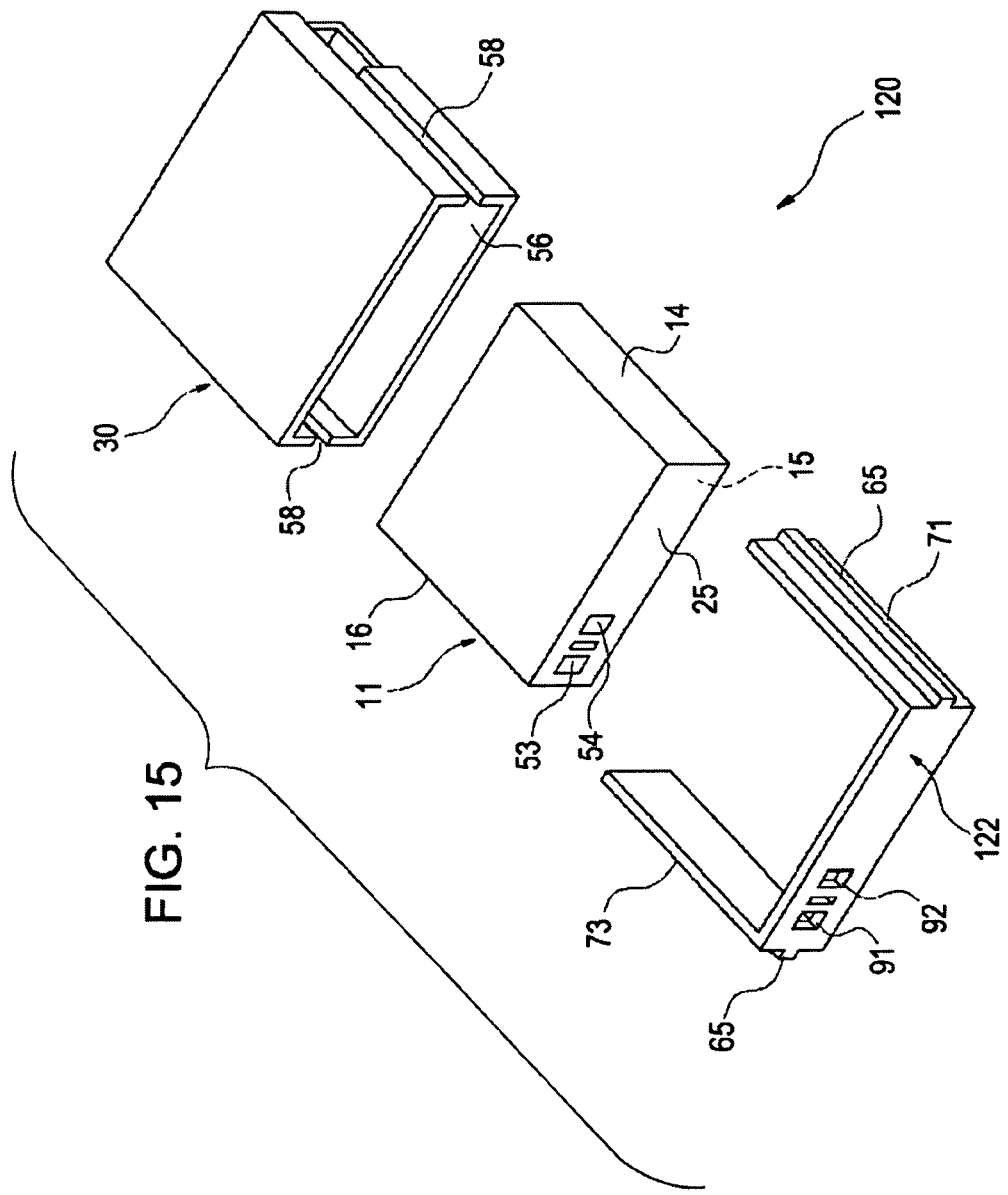
FIG. 15 is an exploded perspective view of a battery pack according to a third modification of the embodiment.

FIG. 15 illustrates a battery pack 120 according to the third modification. The battery pack 120 includes a support 122 instead of the support 32 in the embodiment. The other components of the battery pack 120 are the same as those of the battery pack 10 according to the embodiment.

The support 122 is substantially C-shaped so as to cover the second end face 15 (specifically, the first printed circuit board 25) of the nonaqueous electrolyte secondary battery 11, the first end face 14, and the third end face 16 opposite to the first end face 14.

Covering the second end face 15 (specifically, the first printed circuit board 25) and the first end face 14 with the support 122 can protect the extension path of at least one of the positive electrode terminal and the negative electrode terminal.

In addition, since the support 122 covers the first end face 14 and the third end face 16, the protrusion 65 can be provided for each of the first side wall 71 and the third side wall 73 of the support 122.

Accordingly, the protrusions 65 are engaged with the respective slits 58 of the exterior casing 30, thus achieving the positioning of the battery 11 relative to the exterior casing 30.

In other words, the battery pack 120 according to the third modification can provide the same advantages as those of the battery pack 10 according to the embodiment.

The exterior casing 30 may be formed by bending a single plate-shaped member. Alternatively, the exterior casing 30 may be formed by drawing.

In the above-described embodiments, the exterior casing 30 made of metal has been described. The material of the exterior casing 30 is not limited to metal. The exterior casing 30 may be made of resin.

In the above-described embodiments, the extension of both of the positive electrode terminal and the negative electrode terminal has been described. The present application is not limited to this case. At least one of the positive electrode terminal and the negative electrode terminal may be extended.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A battery pack comprising:
a nonaqueous electrolyte secondary battery that includes a thin-plate-shaped battery element covered with a laminated sheet such that a positive electrode terminal and a negative electrode terminal are exposed, and has a first end face from which the positive electrode terminal and the negative electrode terminal are led out;
an exterior casing that covers five faces of the nonaqueous electrolyte secondary battery, the five faces excluding a second end face adjacent to the first end face
a support that covers the second end face of the nonaqueous electrolyte secondary battery, wherein
the positive electrode terminal and the negative electrode terminal are extended from a first connection portion provided for the first end face to a second connection portion provided for the second end face and are connected to an external power supply provided via the support.

2. The battery pack according to claim 1, wherein the support is L-shaped so as to cover the second end face of the nonaqueous electrolyte secondary battery and further cover the first end face thereof.

3. The battery pack according to claim 2, wherein the support is C-shaped so as to cover a third end face opposite to the first end face of the nonaqueous electrolyte secondary battery.

4. The battery pack according to claim 3, wherein the support is frame-shaped so as to surround the nonaqueous electrolyte secondary battery.

5. The battery pack according to claim 1, wherein the exterior casing has a catch projecting therefrom toward the support.

6. The battery pack according to claim 1, wherein the support has a recess receiving the catch.

7. The battery pack according to claim 1, wherein the support has a flange projecting therefrom toward the inside of the exterior casing, the flange having a through-hole extending therethrough in the thickness direction thereof.

8. A battery-pack exterior casing comprising:
an exterior casing covering a thin-plate-shaped nonaqueous electrolyte secondary battery including a battery element covered with a laminated sheet, wherein
the exterior casing is formed in a box shape so as to cover five faces of the nonaqueous electrolyte secondary battery by folding a single plate-shaped member, the five faces including a first end face from which a positive electrode terminal and a negative electrode terminal are led out,
wherein the exterior casing includes a slit formed to extend opposite of the first end face and shaped to engage a protrusion of a support that covers at least a sixth face of the nonaqueous electrolyte secondary battery.

9. The exterior casing according to claim 8, wherein the exterior casing has a catch projecting inward.

10. The exterior casing according to claim 8, wherein the slit extends in the direction in which the nonaqueous electrolyte secondary battery is inserted into the exterior casing.

11. The exterior casing according to claim 8, wherein the exterior casing has a folded portion provided in the vicinity of an insertion opening through which the nonaqueous electrolyte secondary battery is inserted into the exterior casing.

12. The exterior casing according to claim 8, wherein the exterior casing has an inlet for injection of adhesive.

13. The battery pack according to claim 1, wherein the positive electrode terminal is extended from the first end face to the second end face by a positive-electrode intermediate tab and the negative electrode terminal is extended from the first end face to the second end face by a negative-electrode intermediate tab.

* * * * *